Oct. 10, 1961   J. E. MARTENS   3,003,362
MOTION-TRANSMITTING DEVICE
Filed Feb. 4, 1959   2 Sheets-Sheet 1

INVENTOR.
JACK E. MARTENS
BY W. E. Recktenwald
A. D. McFadyen
C. S. Penfold
ATTORNEY

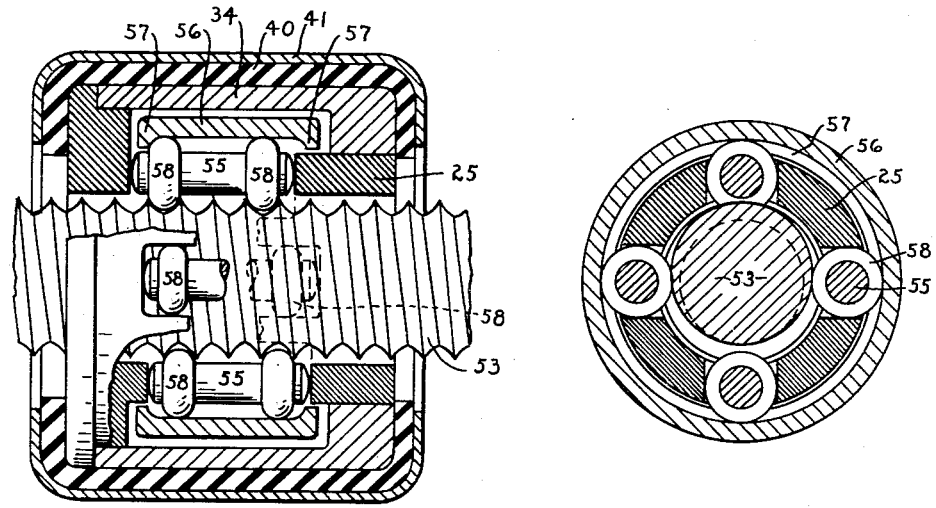
Fig.-5
Fig.-6
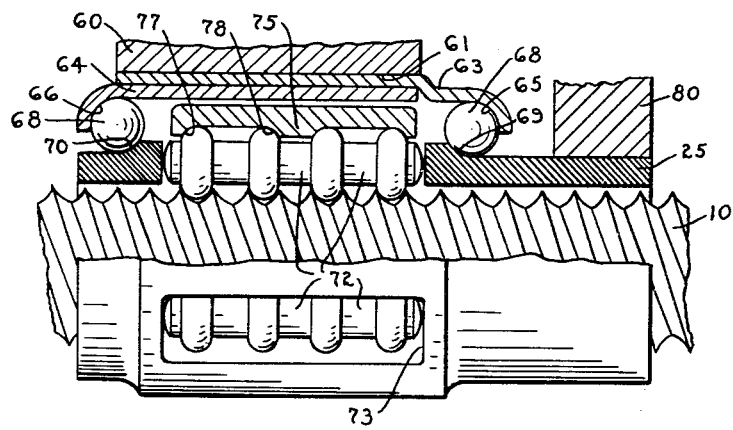
Fig.-7

United States Patent Office 3,003,362
Patented Oct. 10, 1961

3,003,362
MOTION-TRANSMITTING DEVICE
Jack E. Martens, Gary, Ind., assignor to The Anderson Company, a corporation of Indiana
Filed Feb. 4, 1959, Ser. No. 791,113
9 Claims. (Cl. 74—424.8)

This invention relates to a motion-transmitting mechanism, and more particularly to an improved nut-and-screw type mechanism.

Some current devices include a threaded shaft unit and a nut unit. The nut unit commonly comprises an assembly including antifriction bearing elements between the shaft and the outer portion or case of the nut. The bearing elements are spaced circumferentially and/or axially along the shaft in engagement with its threads, and are retained in such position and relationship by a normally, freely rotatable tubular cage interposed between the shaft and case and having apertures in which the several bearing elements are nested. The outer portion or case includes one or more raceways engaging the portions of the bearing elements projecting through the cage, and the raceways are provided with channels, shoulders, or the like, reacting to the thrust of the bearing elements. In operation, upon relative rotation of the shaft and nut, the several bearing elements planetate about the shaft; viz., roll around the shaft carrying the cage with them, their camming action on the threads of the shaft exerting an axial thrust through the raceway to effect axial shifting of either the nut assembly or the shaft, depending upon whether the nut assembly or the shaft is restrained against axial movement.

Such screw-and-nut devices reduce frictional losses to a practical minimum and offer many desirable qualities rendering them highly satisfactory for a wide variety of uses. However, for certain special uses the devices mentioned are limited in their effectiveness by reason of their tendency to slippage under certain conditions of use; and, by reason of the planetating principle, axial movement of the one unit relative to the other is never a fixed value; that is, for instance ten turns of the screw in one direction will advance the nut assembly a fixed amount which will not necessarily equal the amount of reverse movement transmitted to the nut assembly upon rotating the screw ten turns in the opposite direction. Also, in the case where the shafts of such devices are mounted vertically, the relatively low friction characteristics between the nut assembly and the screw (upon suspension of the driving force) sometimes permit the nut under load to back down the screw.

It is the principal object of this invention to provide an improved motion-transmitting mechanism that overcomes the above-noted disadvantages of the prior art and in which the drive from the input to the output is of a substantially fixed value.

It is a further object of the invention to provide an improved motion-transmitting device in which the axially movable element (screw or nut assembly) is advanced or retracted a substantially predetermined amount per revolution of the rotatable element (screw or nut assembly).

It is another object of this invention to provide an improved motion-transmitting device adapted for use with either single-lead threads or with multiple-lead threads.

It is still another object of this invention to provide an improved motion-transmitting device wherein certain embodiments substantially eliminate backing down of the nut assembly relative to the screw.

It is a further object of the invention to provide an improved motion-transmitting device comprised of a few simple, practical, and dependable parts of the known and proven design, combined to produce a dependable, quiet, and smoothly operating device.

Additional objects and features of the invention will become evident when the following description is considered in conjunction with the accompanying drawings.

In the drawings:

FIGURE 5 is a view corresponding to FIGURE 1 of a further modification in which a single-thread screw is employed;

FIGURE 6 is a partial cross-sectional view of FIGURE 5 with the outer case omitted; and FIGURE 7 is a fragmentary view of a motion-transmitting device according to my invention wherein the power input is applied directly to the cage or carrier.

Figure 1:
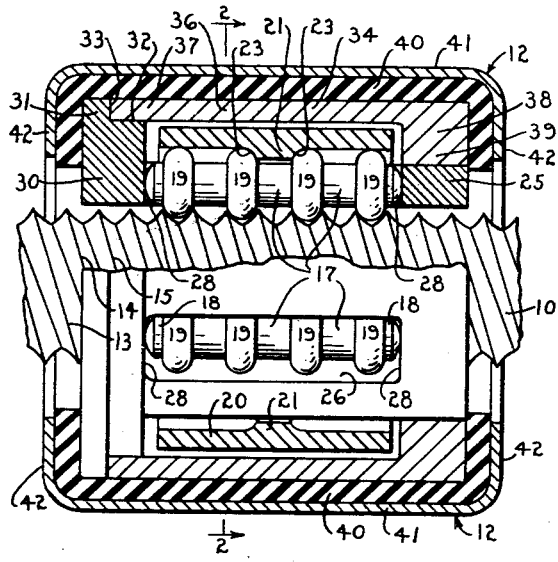
FIGURE 1 is a fragmentary longitudinal sectional view of a motion-transmitting device according to my invention in which the power input is through a multiple-threaded shaft.
Figure 2:
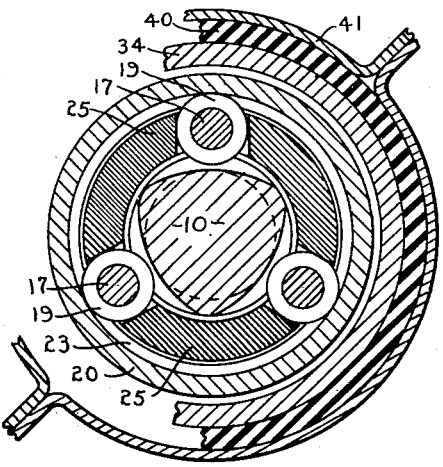
FIGURE 2 is a partial cross-sectional view taken on line 2—2 of FIGURE 1.

Referring initially to FIGURES 1 and 2 of the drawings, there is shown a helically threaded, rotatably driven screw or shaft 10 passing through, supporting, and threadedly engaging a nut assembly generally designated 12. Shaft 10 may be driven by a reversible power unit (not shown) and the nut assembly 12 may be connected to a work load, carriage, or the like, to be moved along the axis of the shaft. The shaft 10 here shown is of the multiple-thread type. More particularly, it includes triple right-hand threads 13, 14, and 15 which may be formed in any appropriate way, such as by rolling. Obviously, there may be any desired number of threads on the shaft, which may be left or right-handed as is best suited to a particular situation.

As shown, the nut assembly 12 consists of a plurality of bearing elements 17, here illustrated as three in number, disposed circumferentially about the shaft. Each end of each bearing element 17 terminates in a pintle 18, and the intermediate portion of each element is formed with a plurality of toroidal bearing portions 19 for engagement between the threads of the shaft. By reason of the pitch of the multiple thread of shaft 10, the corresponding toroidal portion of each of the several bearing elements 17 is engaged with a different thread of the shaft, with the ends of all of the pintles coterminous.

A freely rotatable ring 20 is concentrically disposed about the bearing elements, holding them in rolling contact with the threads of the shaft. As shown, the inner wall of ring 20 is formed with a portion 21 of reduced diameter which forms a pair of oppositely facing raceways 23 adapted to engage with at least two of the toroidal portions of the bearing elements, thus limiting endwise movement of the ring relative to the bearing elements. The manner of maintaining ring 20 against endwise movement is not critical, as will appear from the modifications hereinafter described. A tubular cage 25 is disposed between the ring 20 and shaft 10, said cage being formed with a plurality of circumferentially disposed apertures 26, each receiving one of the bearing elements 17 and retaining it in the established relationship with the longitudinal axis of the bearing elements 17 held in substantially parallel relationship with respect to the axis of the shaft. The pintles 18 of the several bearing elements 17 contact the ends 28 of their respective apertures 26 upon relative rotation of the shaft and cage, and thus transmit their axial thrust to the cage 25. The left-hand end 30 of the cage 25, as viewed in FIGURE 1, is formed with an enlarged rim 31 which has its outer periphery chamfered as at 32 to form a shoulder 33 against which one end of the housing 34 of the nut assembly 12 is seated.

The housing 34 consists of a tubular section 36 telescoped about, but spaced from, ring 20. One end 37 of the housing seats onto the chamfered portion 32 of the cage 25 and abuts the shoulder 33 formed thereby, while the opposite end 38 of the housing is formed with a portion 39 of reduced internal diameter which is fitted upon the right-hand end of cage 25. The connections between the tubular section 36 and the cage 25 are of such a nature that relative movement between the two is substantially eliminated. For dampening vibrations and assuring a slipproof connection between the outer casing and the other elements of the assembly, a resilient sheath or pad 40 encircles housing 34, with the ends of the pad turned radially inward. A band or casing 41, preferably formed of sheet metal, tightly encases the pad with its end portions 42 flanged radially inwardly to firmly secure the parts of the nut assembly 12 together.

With casing 41 connected to a work load to be actuated, such as a vehicle window, and being restrained thereby from turning, rotation of shaft 10 will impart an axial thrust to cage 25 which, being clamped to casing 41, will positively advance or retract the nut assembly, depending upon the direction of rotation of the shaft. The ring 20 carries no load, but simply turns freely in a direction opposite to the direction of rotation of the shaft. The ring 20 acts as a retainer for the bearing elements 17 and holds them in operative contact with the threads of the shaft.

In regard to the several forms of the invention to follow, to facilitate and abbreviate the description, parts identical with or substantially corresponding to parts of FIGURES 1 and 2 will be given the same reference characters as in said figures.

Figure 3:
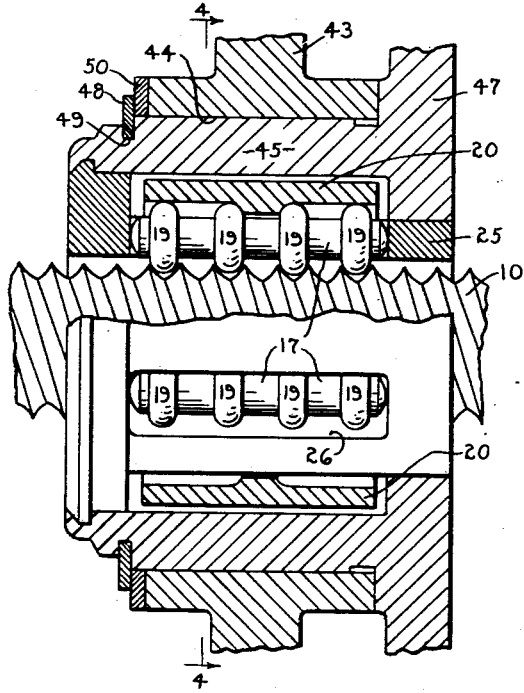
FIGURE 3 is a view corresponding to FIGURE 1 of a modification wherein the power input may be applied to the nut.
Figure 4:
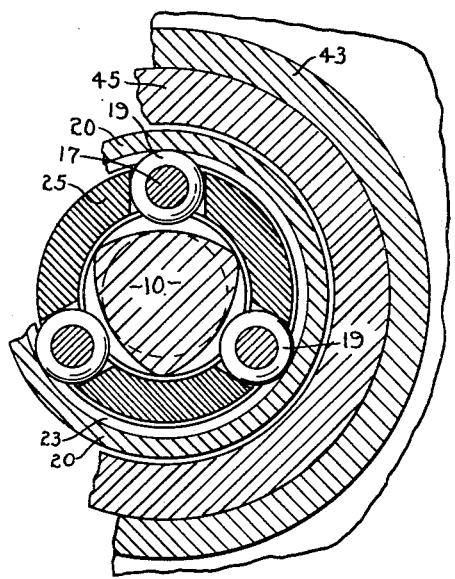
FIGURE 4 is a partial cross-sectional view taken along line 4—4 of FIGURE 3.

The form of the invention shown in FIGURES 3 and 4 differs from that described above in that the nut assembly is rotatably mounted, while restrained from axial movement, and the threaded shaft is to be connected with a work load or body to be traversed and restrained thereby against rotation. Reference character 43 designates a fixed frame having formed therein a bearing surface 44 in which is rotatably mounted a hollow hub 45 of a driving gear or pulley 47. Hub 45 corresponds broadly to the housing 34, pad 40 and casing 41 of FIGURES 1 and 2, and the structure within the hub 45 is substantially the same as in said figures. Thus, within the hub are arranged in concentric-spaced relation a ring 20, cage 25, and bearing elements 17 arranged in apertures 26 formed in the cage. In this modification, the connection between the hub 45 and the cage 25 is effected by means of a bevel on the cage 25 to which the hub is spun into clamping engagement therewith. A split lock ring 48, seated in a groove 49 formed in the end of the hub 45, reacts against a washer 50 to hold the hub 45 in the frame bearing. The operation of this form of the invention is basically the same as that of the first form, except that the power input is to the nut assembly.

The modification of FIGURES 5 and 6 differs from the first form of the invention primarily in that input shaft 53 is formed with a single thread 54, from which it follows that the several bearing elements 55, distributed around the shaft, will perforce be displaced with relation to one another axially along the shaft. Therefore, the ring member 56 has inturned flanges 57 on the opposite end portions of ring 56, engageable with the endmost toroidal portions 58 of certain of said bearing elements 55. For substantially even distribution of the guiding action of flanges 57 on the ring 56, it is desirable to use an even number of bearing elements, such as four, in the single-thread embodiment. The cage element 25 radially and circumferentially supports the bearing elements 55 about the shaft 53. The opposite end portions 60, 61 of the cage element 25 are connected to the housing 34, pad 40, and casing 41 for operation substantially the same as in FIGURES 1 and 2.

The feature of using a single thread on the shaft results in a device wherein the nut assembly connected to the cage 25 for driving movement can be advanced in a relatively slow and predetermined manner. The embodiment of FIGURES 5 and 6 is adapted not only for use with very small actuators where positive predetermined movements are desirable but also for use with average-sized or large-sized actuators. A nut assembly carried by a vertically disposed shaft having a single-lead thread of low pitch angle will normally not roll down the shaft unless stimulated by some external turning force on the shaft. This last-named feature is of particular importance when it is desired to eliminate the need for a braking device for resisting rotation of the shaft under normal load conditions to prevent the nut assembly from backing down the shaft.

In the form of the invention shown in FIGURE 7, the power input is applied directly to the cage 25 for moving the nonrotatable multiple-threaded shaft 10 along the axis of the shaft 10. In FIGURE 7, the numeral 60 designates a fixed frame having a bearing opening 61 in which is securely fastened a pair of telescopically disposed housing members 63 and 64 which have downturned outer end portions forming raceways 65, 66, respectively. A plurality of ball members 68 engage between said raceways 65, 66 and a pair of oppositely facing raceways 69, 70 formed in the peripheral surface of the cage member 25. A plurality of elongated bearing elements 72 are nested in elongated openings 73 formed in the walls of the cage member 25. A ring member 75 encircles a portion of the shaft 10 within the housing members 63, 64 and operatively seats the bearing elements 72 into contact with the threads on the shaft 10. Oppositely facing raceways 77 and 78 are formed in the internal surface of the ring member 75 for engagement with the bearing surfaces of the bearing elements 72 in a manner and for a purpose described with respect to FIGURES 1 and 2. A drive pulley or gear member 80 is fastened onto the one end portion of the cage 25 for receiving rotatable driving motion from an external source of power and for transmitting said driving motion to the cage member 25 for driving the shaft 10 along the axis of the shaft.

While several embodiments of my basic assembly have been portrayed by way of illustration, it will be understood that further modifications might be resorted to without departing from the scope of my invention as set forth in the following claims.

I claim:

1. An antifriction-nut assembly comprising a cage, a threaded shaft extending through said cage, a plurality of bearing elements nested in apertures formed in said cage and operatively engaging the threads of said shaft, freely rotatable ring means encircling said bearing elements for retaining said elements in contact with the shaft, and means carried by said cage for movement therewith relative to the axis of the shaft.

2. A motion-transmitting mechanism comprising driving and driven units, one of said units being connected to a threaded shaft and the other unit being connected to a nut assembly cooperating with said shaft, one of said units being nonrotatable and movable along the axis of the shaft and the other unit being rotatable about the axis of the shaft and fixed against axial movement therewith, said nut assembly comprising a cage member encircling a portion of said shaft, bearing elements seated in apertures in said cage and projecting radially therethrough, a freely rotatable cylindrical ring member encircling said elements for holding them in operative contact with said shaft, and means for connecting said cage member to one of said units.

3. A motion-transmitting arrangement comprising a threaded-shaft unit and a nut-assembly unit threadedly engaging said shaft, one of said units being mounted for rotation while restrained against axial movement and the other unit being restrained against rotation and connectible with an object to be traversed, said assembly comprising a plurality of bearing elements disposed circumferentially about and in engagement with the threads of said shaft, a tubular cage having apertures for receiving said elements, a rotationally unrestrained ring encircling said cage in engaging relation with projecting portions of said elements and retaining said elements in operative contact with the shaft, and means mounted on said cage in spaced relation to the ring for connecting the nut assembly to either an input or an output element.

4. A motion-transmitting mechanism for a carriage or the like comprising driving and driven units, one of said units being a threaded shaft and the other unit being an antifriction-nut assembly cooperating with said shaft, one of said units being connectible to the carriage to actuate the same and the other being fixed against axial movement, said assembly comprising a plurality of bearing elements spaced about the shaft in operative contact with the threads thereof, a tubular cage encircling said shaft and having apertures in which said elements nest and through which they project, a rotationally unrestrained ring encircling a portion of said cage and retaining said elements in contact with the shaft, a housing encircling said ring in spaced relation thereto, said housing being rigidly connected to said cage, and means for connecting said cage either to the carriage or to a power source.

5. A motion-transmitting mechanism comprising a supporting frame structure formed with a bearing opening therethrough, a rotary power-input means including a housing journaled in said bearing opening, a threaded shaft extending coaxially through said housing for nonrotatable connection to an object to be traversed, a plurality of bearing elements within said housing and spaced circumferentially of said shaft, a tubular cage encircling a portion of said shaft for supporting said elements, a rotationally unrestrained ring encircling a portion of the cage for holding said elements in operative contact with said shaft, and means for connecting said housing to said cage whereby rotation of the housing will move the shaft in an axial direction.

6. A motion-transmitting mechanism comprising a frame structure having a bearing opening therethrough, a threaded shaft extending coaxially through said opening for nonrotatable connection with an object to be traversed, a plurality of bearing elements within said opening and disposed about said shaft, a tubular cage for supporting said elements about said shaft, the end portions of the cage extending beyond the opening in said frame and each end portion being formed adjacent said frame with a guide shoulder, a rotationally unrestrained ring encircling said cage and holding said elements in operative contact with said shaft, a tubular housing seated in and extending through said opening, the ends of said housing being flanged inwardly toward said guide shoulders, antifriction means positioned between said flanges and shoulders, and a power-input element connected to one of the projecting end portions of said cage whereby said cage is rotatably driven relative to said frame structure for axially moving the shaft through said opening therein.

7. A motion-transmitting nut assembly comprising a threaded shaft, a cylindrical cage member encircling a portion of said shaft and having a plurality of circumferentially equally spaced apertures therein, a plurality of elongated bearing elements seated in said apertures, toroidal bearing surfaces radially extending from said bearing elements, a cylindrical ring member encircling said bearing elements and said cage member for retaining said toroidal bearing surfaces in operative contact with the threads of the shaft, and input and output elements operatively connected to said shaft and to said cage member for converting a substantially predetermined amount of rotational movement of the one element to a substantially predetermined amount of axial movement of the other element.

8. A motion-transmitting nut assembly comprising a shaft having a single-lead thread in the surface thereof, a cylindrical cage member encircling a portion of said shaft and having a plurality of circumferentially equally spaced apertures therein, each adjoining aperture in said cage member being displaced a predetermined amount in an axial direction relative to the adjoining apertures, a plurality of elongated bearing elements seated in said apertures, toroidal bearing surfaces radially extending from said bearing elements, a cylindrical ring member encircling said bearing elements and said cage member for retaining said toroidal bearing surfaces in operative contact with the thread of the shaft, and input and output elements operatively connected to said shaft and to said cage member for converting a substantially predetermined amount of rotational movement of the one element to a substantially predetermined amount of axial movement of the other element.

9. A motion-transmitting nut assembly comprising a multiple-threaded shaft, a cylindrical cage member encircling an axial portion of said shaft and having a plurality of apertures therein, an elongated bearing element seated in each of said apertures, at least two toroidal bearing surfaces radially extending from said bearing elements, a cylindrical ring member encircling said bearing elements and said cage member, raceways in said ring member in operative contact with said toroidal bearing surfaces for retaining said bearing surfaces in operative contact with the threads of the shaft, and input and output elements operatively connected to said shaft and to said cage member for converting a substantially predetermined amount of rotational movement of one element to a substantially predetermined amount of axial movement of the other element.

References Cited in the file of this patent

UNITED STATES PATENTS

| 2,488,256 | Anderson | Nov. 15, 1949 |
| 2,525,326 | Wahlmark | Oct. 10, 1950 |
| 2,714,005 | Wise | July 26, 1955 |
| 2,795,149 | Morris | June 11, 1957 |
| 2,844,969 | Lohr | July 29, 1958 |

FOREIGN PATENTS

| 513,096 | Great Britain | Oct. 3, 1939 |